United States Patent [19]

Caudy et al.

[11] 4,404,170
[45] Sep. 13, 1983

[54] INSTANTANEOUS START AND STOP GAS GENERATOR

[75] Inventors: Don W. Caudy, Sunbury; Donald J. Hackman, Columbus, both of Ohio; Robert T. Hoffman, Kailua, Hi.; Dale G. Uhler, Alexandria, Va.

[73] Assignee: The United States of America as represented by the Secretary of the Navy, Washington, D.C.

[21] Appl. No.: 371,142

[22] Filed: Apr. 23, 1982

[51] Int. Cl.³ ............................................. B01J 7/02
[52] U.S. Cl. .................................... 422/237; 423/657
[58] Field of Search ............... 422/122, 236, 237, 264, 422/268, 301, 305, 238; 48/61; 423/657, 659; 261/121 R, 122–124; 405/205

[56] References Cited

U.S. PATENT DOCUMENTS

| | | | |
|---|---|---|---|
| 2,003,745 | 6/1935 | Forsberg | 422/237 |
| 2,062,609 | 12/1936 | Reid | 422/237 |
| 3,346,506 | 10/1967 | Beumel, Jr. | 423/657 X |
| 3,370,925 | 2/1968 | Trueblood | 423/657 |
| 3,459,493 | 8/1969 | Ross | 423/657 X |
| 3,540,485 | 11/1970 | Kummins | 423/657 X |
| 3,715,189 | 2/1973 | Nighohossian et al. | 422/236 X |
| 3,787,186 | 1/1974 | Geres | 422/111 |
| 3,895,102 | 7/1975 | Gallagher | 423/657 |
| 4,055,632 | 10/1977 | Hoffman et al. | 423/659 X |
| 4,064,226 | 12/1977 | Becker et al. | 423/657 |

FOREIGN PATENT DOCUMENTS

| | | | |
|---|---|---|---|
| 1251723 | 10/1967 | Fed. Rep. of Germany | 422/238 |
| 896038 | 5/1962 | United Kingdom | 423/657 |

Primary Examiner—Richard L. Chiesa
Attorney, Agent, or Firm—Robert F. Beers; Ervin F. Johnston; Thomas Glenn Keough

[57] ABSTRACT

A gas generator is provided which can be selectively switched between reaction and nonreaction modes. The gas generator incudes a reaction chamber which has top and bottom ends. The chamber contains reactive and nonreactive liquids, the nonreactive liquid having a greater specific gravity than the reactive liquid. A solid reactant member is provided. A device is provided for projecting the solid reactant member through the bottom of the chamber, thence through the nonreactive liquid, and thence into the reactive liquid for generating gas. Further, a device is provided for withdrawing the solid reactant member from the reactive liquid into the nonreactive liquid for terminating the generation of gas.

9 Claims, 2 Drawing Figures

*REACTION MODE*

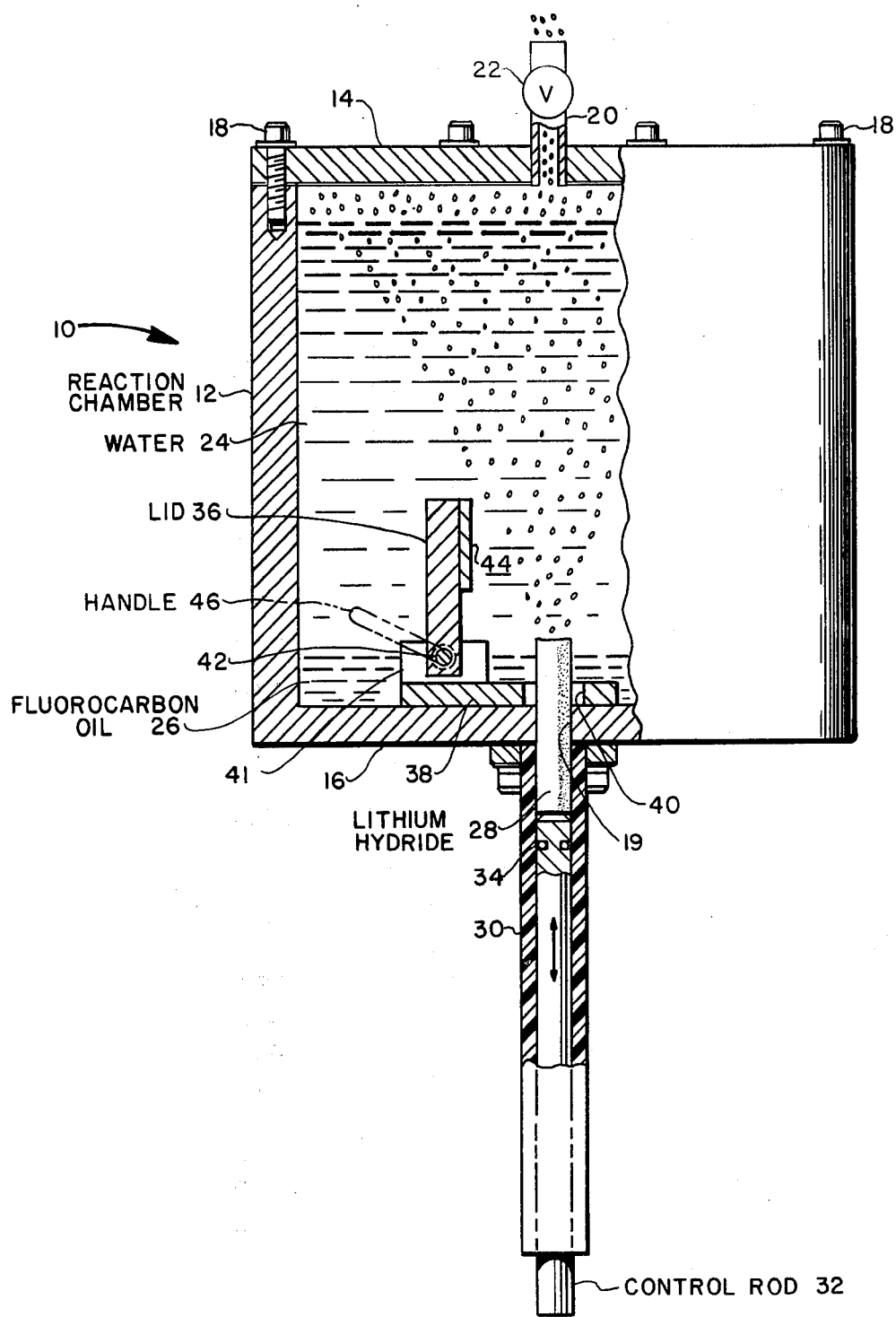
FIG.1. REACTION MODE

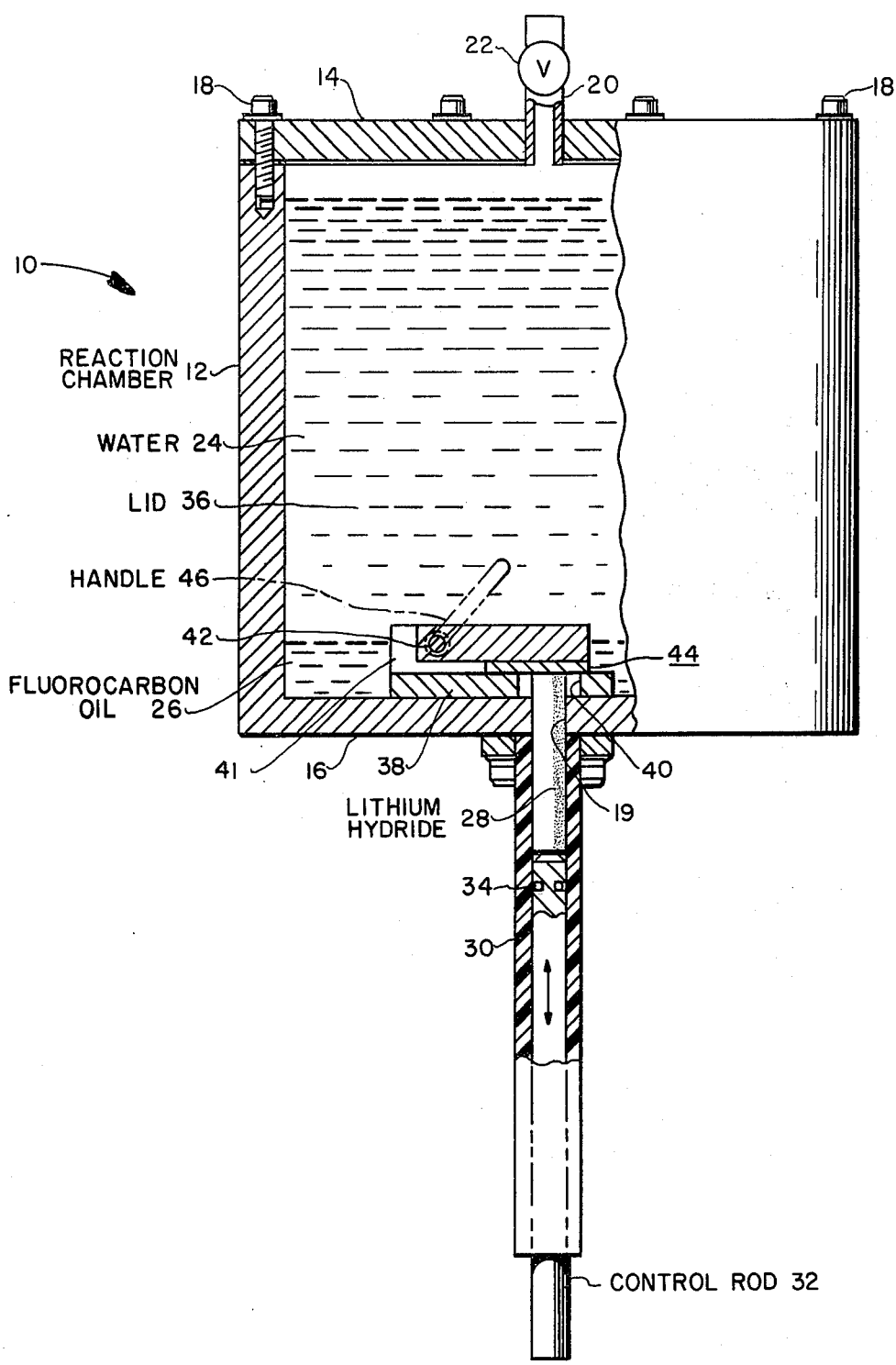
FIG.2. NONREACTION MODE

INSTANTANEOUS START AND STOP GAS GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Variable buoyancy systems are commonly employed in salvaging objects from the ocean or positioning and recovering oceanographic instrumentation. These buoyancy systems may take several different forms, such as lift bags or ballast tanks. Historically, high pressure air tanks have been utilized for deballasting such buoyancy systems. More recently, various materials have been reacted to generate a gas for deballasting the systems. Hydrazine is commonly reacted to generate a gas, and has been found highly satisfactory for raising objects from the ocean bottom. However, hydrazine is not cost effective and is very hazardous for personnel to handle. Gas generated by reacting metallic hydrides is safer and considerably more cost effective.

Previous metallic hydride gas generating systems have used nonreactive water insoluble hydrocarbons such as hexane, kerosene, mineral oil, and benzene to form extrudable slurries or paste when blended with powdered metallic hydride. Additionally, nonreactive water soluble organic liquids such as tetrahydrofuran, dioxane, and glycol ethers have been incorporated in the slurries to control solubility and, thus, the reaction rates of the metallic hydride with water. Because of the large amount of nonreactive materials required, these slurries have been heavy and bulky. In addition, they are difficult to store and require special handling and pumping equipment.

A recent metallic hydride gas generator is described in U.S. Pat. No. 4,055,632 to Robert T. Hoffman. In this gas generator, metallic hydride pellets are selectively released from a nonreactive liquid to a reactive liquid for the generation of gas. This generator is highly satisfactory for raising small objects, however, a more practical system is required for raising large objects from the ocean bottom. Also, the gas generator described in the patent will not terminate the generation of gas quickly since the pellets must be completely expended once they are disseminated into the reactive liquid.

SUMMARY OF THE INVENTION

The present invention provides a gas generator which can be selectively controlled to instantaneously commence or terminate the generation of gas. This has been accomplished by providing a reaction chamber which has top and bottom ends. The chamber contains reactive and nonreactive liquids, the nonreactive liquid having a greater specific gravity than the reactive liquid. A solid reactant member is provided. A device is provided for projecting the solid reactant member through the bottom of the chamber, thence through the nonreactive liquid, and thence into the reactive liquid for generating gas. Further, a device is provided for withdrawing the solid reactant member from the reactive liquid into the nonreactive liquid for terminating the generation of gas. With this arrangement, the gas generator can be selectively switched between reaction and nonreaction modes instantaneously.

STATEMENT OF THE OBJECTS OF THE INVENTION

An object of the present invention is to overcome the aforementioned problems associated with prior art gas generators.

Another object is to provide a gas generator which can be easily controlled to instantaneously start and stop a gas producing reaction.

A further object is to provide a controlled gas generator of the type utilizing a reactant, a nonreactive liquid, and a reactive liquid in which the reaction between the reactant and the reactive liquid can be substantially instantaneously stopped by selectively moving the reactant.

Still a further object is to provide a method of generating gas which will instantaneously control the starting and stopping of a reaction of gas producing materials.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a side view of the gas generator in a reaction mode with portions cut away to illustrate various details thereof.

FIG. 2 is a side view of the gas generator in a nonreaction mode with portions cut away to illustrate various details thereof.

DESCRIPTION OF THE PREFERRED EMBODIMENT

Referring now to the drawings there is illustrated a gas generator 10 which can be selectively switched between reaction and nonreaction modes to instantaneously start and stop the reaction of gas producing materials. The gas generator includes a reaction chamber 12. The reaction chamber, which may be cylindrical, has top and bottom ends 14 and 16 respectively, the top end 14 being sealably secured to the remainder of the chamber by any suitable means such as bolts 18 and the bottom end 16 having an opening 19. A conduit 20 may communicably extend through the chamber top 14 and may be provided with an on/off valve 22 for selectively opening the chamber to release gas generated therein.

The reaction chamber 12 may contain reactive and nonreactive liquids 24 and 26, the nonreactive liquid 26 having a greater specific gravity than the reactive liquid 24. In the preferred embodiment, the reactive liquid is water and the nonreactive liquid is a fluorocarbon, such as "Halocarbon" oil 13–21 which is sold under that trademark by Halocarbon Products Corporation. The specific gravity of the 13–21 oil is 1.9.

The gas generator 10 may further include a solid reactant member 28. In the preferred embodiment, the solid reactant member is a cylinder of lithium hydride material. The lithium hydride cylinder may be made by compressing a combination of 90% lithium hydride powder and 10% Teflon powder to about 60,000 psi.

Means are provided for projecting the lithium hydride cylinder 28 through the bottom opening 19 of the chamber, thence through the nonreactive oil 26, and thence into the reactive water for generating hydrogen gas. The projecting means may include a tube 30 which is communicably connected to the chamber at its bottom opening 19 and a control rod 32 which is slidably mounted in the tube 30. A top portion of the control rod 32 may be provided with an O-ring 34 for sealing the interior of the reaction chamber 12 from ambient. With this arrangement, the control rod can be forced upwardly in engagement with the bottom of the lithium hydride cylinder 28 to project the cylinder 28 into the reactive water 24 for generating hydrogen gas.

Further, means are provided for withdrawing the lithium hydride cylinder 28 from the reactive water into the nonreactive oil for terminating the generation of gas. The withdrawing means may include a lid 36 which is pivotally mounted in the chamber 12 for engaging the top of the lithium hydride cylinder 28. The pivotal connection may be accomplished by a platform 38 which is mounted on the bottom of the chamber 12 with an opening 40 which is coextensive with the bottom opening 19 of the chamber. The platform 38 may be provided with an upstanding flange 41 to which the lid 36 may be pivoted by a pin 42. A rubber pad 44 may be affixed to the lid for actual engagement with the top of the lithium hydride cylinder 28. The withdrawing means may further include handle means which is connected to the lid 36 and which extends through the chamber 12 for moving the lid to engage and force the lithium hydride cylinder 28 downwardly out of the reactive water 24. The handle means may include a handle 46 and an extension of the pin 42 which sealably extends through the wall of the chamber 12 and which has an outer extension which is connected to the handle 46. With this arrangement, the handle 46 can be simply hand operated to open the lid 36, as illustrated in FIG. 1, or to close the lid, as illustrated in FIG. 2. When the lid 46 is closed it will push the lithium hydride cylinder 28 downwardly and out of the reactive water.

The method of the invention for controlling the generation of gas includes providing the chamber 12 with the reactive and nonreactive liquids 24 and 26 respectively, providing the solid reactant material 28; projecting the solid reactant material 28 through the nonreactive liquid 26 and into the reactive liquid 24 to generate gas; and withdrawing the solid reactant material 28 from the reactive liquid 24 into the nonreactive liquid 26 for terminating the generation of gas. These two modes of operation are illustrated in FIGS. 1 and 2 respectively. The method of the invention may further include projecting the solid reactant material 28 into the reactive liquid 24 with a rod 32, and withdrawing the solid reactant material 28 from the reactive liquid 24 with a lid 36.

OPERATION OF THE INVENTION

In the operation of the invention, the lithium hydride cylinder 28 is inserted into the tube 30 followed by the control rod 32. At this stage, the lithium hydride cylinder 28 is not inserted into the chamber 12. The chamber top 14 is then removed and nonreactive fluorocarbon oil 26 and reactive water 24 are poured therein leaving a slight air space at the top. The top 14 is then sealably replaced by bolts 18. If the generation of gas is desired, the control rod 32 is pushed upwardly against the lithium hydride cylinder 28 to force the cylinder 28 into the reactive water 24. The gas thus generated is taken from the chamber 12 via conduit 20 for inflation purposes. When it is desired to terminate the generation of gas, the handle 46 is turned to cause the lid 36 to engage the top of the lithium hydride cylinder 28 and push the cylinder downwardly out of the reactive water into the nonreactive fluorocarbon oil 26. When the gas generator 10 is utilized as described, the starting and stopping of the gas producing reaction can be accomplished instantaneously.

Obviously, many other modifications and variations of the present invention are possible in the light of the above teachings. It is therefore to be understood that within the scope of the appended claims the invention may be practiced otherwise than as specifically described.

What is claimed is:

1. A gas generator which can be selectively switched between reaction and nonreaction modes comprising:
    a reaction chamber having top and bottom ends and capable of containing reactive and nonreactive liquids, the nonreactive liquid having a greater specific gravity than the reactive liquid;
    a tube communicably connected to the bottom of the chamber so as to be capable of slidably receiving a cylinder of reactant material;
    a rod slidably and sealably mounted in the tube for engaging the bottom of the reactant cylinder so as to be capable of forcing the reactant cylinder up into reactive liquid in the reaction chamber; and
    means for forcing the reactant cylinder downwardly in the tube out of the reacting liquid and into the nonreactive liquid,
    whereby gas can be generated by forcing the reactant cylinder into the reacting liquid and gas generation can be terminated by forcing the reactant cylinder out of the reacting liquid into the nonreacting liquid.

2. A gas generator as claimed in claim 1 including:
    the reactant cylinder forcing means being located within the reaction chamber and being operable from outside the reaction chamber.

3. A gas generator as claimed in claim 1 including:
    the reactant cylinder, the reacting liquid, and the nonreacting liquid; and
    the reactant cylinder being lithium hydride, the reacting liquid being water, and the nonreacting liquid being a fluorocarbon oil.

4. A gas generator as claimed in claim 3 including:
    the lithium hydride cylinder forcing means being located within the reaction chamber and being operable from outside the reaction chamber.

5. A gas generator as claimed in claim 3 wherein the reactant cylinder forcing means includes:
    lid means;
    means pivotally mounting the lid means inside the chamber for engaging or disengaging the top of the lithium hydride cylinder; and
    handle means sealably extending through the chamber and connected to the pivotal mounting means for selectively moving the lid to engage the top of the lithium hydride cylinder and force the cylinder downwardly out of the water.

6. A gas generator which can be selectively switched between reaction and nonreaction modes comprising:
    a reaction chamber having top and bottom ends with an opening in its bottom end;
    said chamber containing reactive and nonreactive liquids, the nonreactive liquid having a greater specific gravity than the reactive liquid;
    a solid reactant member;

means for projecting the solid reactant member through the bottom opening of the chamber, through the nonreactive liquid, and into the reactive liquid for generating gas; and means for withdrawing the solid reactant member from the reactive liquid into the nonreactive liquid for terminating the generation of gas.

7. A gas generator as claimed in claim 6 wherein the projecting means includes:

a tube communicably connected to the chamber at its bottom opening and a rod slidably mounted in the tube.

8. A gas generator as claimed in claim 7 wherein the withdrawing means includes:

a lid pivotally mounted in the chamber for engaging the solid reactant member; and means connected to the lid and extending through the chamber for moving the lid to engage and force the reactant material downwardly out of the reactive liquid.

9. A gas generator as claimed in claim 8 including:

the reactant member being composed of lithium hydride;

the reacting liquid being water; and the nonreactive liquid being fluorocarbon oil.

* * * * *